United States Patent [19]

Hentges et al.

[11] Patent Number: 5,693,721
[45] Date of Patent: Dec. 2, 1997

[54] AROMATIC TACKIFIER RESIN

[75] Inventors: Steven George Hentges, Houston, Tex.; Frank Carl Jagisch; Edward Francis Smith, both of Baton Rouge, La.

[73] Assignee: Exxon Chemical Patents Inc., Houston, Tex.

[21] Appl. No.: 799,971

[22] Filed: Feb. 14, 1997

Related U.S. Application Data

[60] Division of Ser. No. 333,922, Nov. 3, 1994, Pat. No. 5,656,698, which is a continuation-in-part of Ser. No. 148,137, Nov. 3, 1993, abandoned.

[51] Int. Cl.$^6$ .................................................. C08F 8/04
[52] U.S. Cl. ........................... 525/339; 525/327.9; 525/338
[58] Field of Search ............................... 525/338, 339

[56] References Cited

U.S. PATENT DOCUMENTS

| | | | |
|---|---|---|---|
| 3,554,940 | 1/1971 | Arakawa et al. | 260/5 |
| 3,700,758 | 10/1972 | Johnson, Jr. et al. | 260/897 |
| 3,701,760 | 10/1972 | Hagemeyer, Jr. et al. | 260/82 |
| 3,926,878 | 12/1975 | Shimizu et al. | 260/27 |
| 4,078,132 | 3/1978 | Lepert | 526/76 |
| 4,514,554 | 4/1985 | Huges et al. | 526/339 |
| 4,629,766 | 12/1986 | Malatesta et al. | 525/222 |
| 4,677,176 | 6/1987 | Evans et al. | 526/290 |
| 4,683,268 | 7/1987 | Ahner | 525/237 |
| 4,916,192 | 4/1990 | Hentges | 525/327.9 |
| 4,952,639 | 8/1990 | Minomiya et al. | 525/327.9 |
| 5,106,902 | 4/1992 | Yang | 524/458 |

FOREIGN PATENT DOCUMENTS

| | | |
|---|---|---|
| 0 383 497 A1 | 8/1990 | European Pat. Off. . |
| 0 196 844 B1 | 9/1992 | European Pat. Off. . |
| WO 90/15111 | 12/1990 | WIPO . |
| WO 91/07472 | 5/1991 | WIPO . |
| WO 91/13106 | 9/1991 | WIPO . |
| WO 93/19097 | 9/1993 | WIPO . |

*Primary Examiner*—Bernard Lipman
*Attorney, Agent, or Firm*—W. G. Muller; John E. Schneider

[57] ABSTRACT

The invention comprises a hydrogenated hydrocarbon resin suitable as tackifier for acrylic adhesive polymers, having greater than 20% aromatic protons after hydrogenation, a z-average molecular weight of less than about 1800, a narrow molecular weight distribution, typically of less than or equal to 2.1, and a softening point of from 40° C. to about 120° C. It additionally comprises a method for preparing a hydrogenated aromatic tackifier resin suitable as tackifier for acrylic adhesive polymers comprising the steps of: a) polymerizing under Friedel-Crafts polymerization conditions steam-cracked petroleum distillates, or fractions thereof; having boiling points between about 135° C. and 220° C. and containing at least 40% of by weight vinyl aromatic monomer contents, in the presence of a chain transfer agent; and b) catalytically hydrogenating the results of a) such that at least 75% of the aromaticity is retained. The invention also comprises the use of this hydrogenated hydrocarbon resin as tackifier for an adhesive composition comprising one or more adhesive base polymers selected from acrylic copolymers, styrene block copolymers and ethylene-vinyl ester copolymers wherein improved adhesive properties are observed.

3 Claims, No Drawings

AROMATIC TACKIFIER RESIN

This is a divisional of application Ser. No. 08/333,922, filed Nov. 3, 1994, now U.S. Pat. No. 5,656,698 which is a continuation-in-part of Ser. No. 08/148,137 filed Nov. 3, 1993 and is now abandoned.

TECHNICAL FIELD

This invention relates to hydrogenated hydrocarbon resins, methods of preparation and uses as tackifiers for adhesive compositions comprising polar-group containing copolymers, particularly acrylic copolymers.

BACKGROUND OF THE INVENTION

Acrylic polymer compositions have long been used as adhesive compositions, particularly in pressure-sensitive adhesive ("PSA") compositions. They exhibit adhesion to a broad variety of surfaces, show good low temperature performance, generally yield attractively clear adhesives and possess excellent heat, age and UV stability. Acrylic adhesive polymers are available as organic(solvent) solutions, aqueous emulsions and as 100 percent solids, thermoplastic systems that are melt applied. Perhaps initially most important were the solvent acrylics, but the environmental/health/safety needs of industry have resulted in dramatic growth in water based acrylics.

Traditionally acrylic PSA compositions have been tailored in characteristics by choice of acrylic monomers and polymerization conditions. This is unlike many other PSA compositions which traditionally have used tackifier resins, diluent oils, antioxidants, etc. to modify and enhance properties. With increasing desirability of water based systems and often their demonstration of significant performance enhancements with tackifier resins, increasing adhesive performance demands and a desire to minimize the need to adjust and modify the acrylics polymerization process, tackifier resins suitable for acrylics are being sought. Both rosin derivatives, such as rosin esters, and hydrocarbon resins are commercially used as tackifiers in such blends. The rosin esters have been preferred due to better compatibility with acrylics. However, the color and heat, age, and UV stability properties of rosin esters, even when hydrogenated, are inferior to those of acrylics and thus yield compositions of compromised properties when used as tackifiers for such systems. Hydrocarbon based resins have been employed as tackifiers for acrylics, but have often lacked the color, stability, compatibility or adhesive performance that are sought in high performance acrylic adhesive systems, particularly those based on the more polar acrylic adhesive polymers. Newer hydrocarbon resins suitable as tackifiers for acrylic copolymer compositions are thus being sought, as are acrylic copolymer compositions having improved properties including tack, adhesion, and clarity.

U.S. Pat. No. 5,106,902 addresses internally tackified acrylic copolymer compositions prepared by dissolving a hydrogenated hydrocarbon resin in a liquid monomer mixture from which the copolymer is to be prepared by free radical initiated emulsion polymerization. A preferred resin is a hydrogenated petroleum resin prepared by Friedel-Crafts polymerization of steam-cracked petroleum distillates, or fractions thereof, having boiling points between about 135° C. and 220° C. and containing 10–100% by weight vinyl aromatic monomer contents. Preferably the aromatic content of the resin is about 20–65%, most preferably 30–50%. The resins typically are said to have ring and ball softening points of between about 10° C. and about 100° C.

EP-B-0 196 844 describes the use in aqueous acrylic polymers of an aqueous emulsion of a hydrocarbon resin having a softening point from 10° to 120° C. and being a copolymer of predominantly $C_5$ olefins and diolefins and from 10 to 60 wt % of one or more monovinyl aromatic compounds. A preferred range of the monovinyl aromatic compounds is 10 to 40 wt %, more preferably 10 to 30 wt %. The resin is not said to be hydrogenated and is lacking in compatibility with acrylic polymers containing butyl acrylate.

EP-B-0 388 497 describes a hydrocarbon resin tackifier for butyl acrylate based polymers wherein the resin is derived from a petroleum cracked distillate comprising unsaturated materials which are $C_5$–$C_6$ mono-olefins and monovinyl aromatic monomers. These are used in proportions such that the resin has 35 to 85 wt % aromatic compound, preferably 40 to 70 wt %. The ring & ball softening point is 10° to 90° C., preferably up to 80° C. This resin as well is not said to be hydrogenated. In the examples no softening point above 75° C. is illustrated and % aromaticity is not greater than 80%.

SUMMARY OF INVENTION/INVENTION DISCLOSURE

The invention comprises a hydrogenated hydrocarbon resin suitable as a tackifier for acrylic adhesive polymers, having greater than 20% aromatic protons by NMR, a z-average molecular weight of less than about 1800, a narrow molecular weight distribution, typically of less than or equal to 2.1 polydispersity ($M_w/M_n$), and a softening point of from 40° C. to about 120° C. It additionally comprises a method for preparing a hydrogenated aromatic tackifier resin suitable as a tackifier for acrylic adhesive polymers comprising the steps of: a) polymerizing under Friedel-Crafts polymerization conditions steam-cracked petroleum distillates, or fractions thereof, having boiling points between about 135° C. and 220° C. and containing at least 40% by weight vinyl aromatic monomer contents, in the presence of 0–40% by weight of polymerization mixture of a chain transfer agent; and b) catalytically hydrogenating the results of a) such that at least 75% of the aromaticity is retained. The invention also comprises the use of this hydrogenated petroleum resin as a tackifier for an adhesive composition comprising one or more adhesive base polymers selected from acrylic copolymers, styrene block copolymers and ethylene-vinyl ester copolymers wherein improved adhesive properties are observed.

BEST MODE AND EXAMPLES OF THE INVENTION

The hydrogenated petroleum resin of the invention is typically one based upon catalytic polymerization of principally aromatic monomers which after polymerization and hydrogenation retains at least 20% aromatic protons by NMR, preferably at least 24% aromatic protons. It has a z-average molecular weight ("$M_z$") less than about 1800, preferably less than 1300, more preferably less than 1100, and most preferably less than or equal to 1060. It has a polydispersity ($M_w/M_n$), or molecular weight distribution ("MWD"), of less than 2.1, preferably less than 1.90 and a ring and ball softening point (according to ASTM E-28) of 70° to 120° C., preferably 80° to 100° C., more preferably 90° to 100° C. The invention resin also preferably exhibits an initial color after hydrogenation of greater than or equal to 10 Saybolt, preferably greater than or equal to 20 Saybolt, most preferably greater than or equal to 24 or 26 Saybolt.

The resins meeting this description have been discovered to exhibit excellent compatibility with acrylic adhesive polymers, excellent color characteristics and stability and excellent tackification attributes.

Aromaticity of the invention resins is that measured by $^1$H-NMR, proton NMR, analysis in accordance with generally accepted procedures. The "retained aromaticity" is the ratio of the aromaticity by $^1$H-NMR of the hydrogenated resin to that of the polymerized resin prior to hydrogenation. The molecular weight characterizations are determined by gel permeation chromatography utilizing a polystyrene calibration basis and then converting to a polyisobutylene calibration basis according to the equation $\log (MW_{polyisobutylene}) = 1.11 \times \log (MW_{polystyrene}) - 0.517$. Both procedures are described in relevant literature, see in particular WO-A-91 07472. The adhesive properties of adhesive compositions comprising the acrylic polymers and tackifier resins are typically measured in accordance with test methods set by the Pressure Sensitive Tape Council ("PSTC").

The terms acrylic polymers, acrylic adhesive polymers and acrylic copolymers are meant to include those polymers made from vinyl acids and/or esters which are polymerizable under free radical conditions, optionally with other ethylenically unsaturated monomers copolymerizable with them under the same free radical polymerization conditions. Preferably the vinyl acids and/or esters are selected from the (meth) acrylic acids or alkyl (meth) acrylates. Mixtures of one or more acids and/or esters are usually included.

These acrylate monomer mixtures generally comprise lower alkyl (meth) acrylates having 1 to 3 carbon atoms in the alkyl group of the ester and upper alkyl (meth) acrylates having 4 or more, usually up to about 14, preferably 4 to 8 carbon atoms. Other monomer components useful in accordance with the invention are the (meth) acrylic acid(s). Some preferred examples of monomers are as follows: acrylic acid, methacrylic acid, crotonic acid, maleic acid, itaconic acid, methyl (meth) acrylate, ethyl (meth) acrylate, propyl acrylate, 2-ethylhexyl acrylate, or n-butyl acrylate. Other monomeric material which can be employed can include acrylonitrile, vinyl acetate, vinylidene chloride, styrene, methyl styrene, and the like. The monomer mixture would contain from 1% to about 15%, preferably about 2% to about 6% of the (meth) acrylic acid; 0% to about 50%, preferably about 10% to 35%, lower alkyl (meth) acrylate; and from about 25% to 99%, preferably from 60% to about 88% higher alkyl (meth) acrylate. All percents are by weight of the monomer mixture.

The resins according to the invention typically can be prepared by catalytic polymerization of petroleum fractions identified as Heartcut Distillate or HCD and 0–40% by wt. of a chain transfer agent. Table IA illustrates a typical analysis of HCD, however it may vary considerably as to specific proportions of these typical components.

TABLE IA

TYPICAL HEARTCUT DISTILLATE (HCD) COMPOSITION (WT %)

| Component (Wt %) | Typical Content | Typical Range |
|---|---|---|
| toluene | 0.10 | 0–0.2 |
| ethyl benzene | 0.69 | 0.01–1.0 |
| m/p-xylene | 2.68 | 0.1–5.0 |
| styrene | 7.83 | 0.8–10.0 |
| o-xylene | 3.76 | 0.1–5.0 |
| cumene | 0.39 | 0.01–1.0 |

TABLE IA-continued

TYPICAL HEARTCUT DISTILLATE (HCD) COMPOSITION (WT %)

| Component (Wt %) | Typical Content | Typical Range |
|---|---|---|
| isopropyl cyclohexane | 1.03 | 0.4–2.0 |
| n-propyl benzene | 2.18 | 0.8–3.0 |
| 3-ethyl toluene | 3.42 | 2.5–6.0 |
| 4-ethyl toluene | 1.71 | 1.0–2.5 |
| tri methyl benzene | 1.21 | 1.0–3.0 |
| alpha-methyl styrene | 3.39 | 2.5–6.0 |
| beta-methyl styrene | 0.74 | 0.5–2.0 |
| o/m-methyl styrene | 8.57 | 5.0–20.0 |
| 1,2,4-tri methyl benzene | 4.46 | 3.0–10.0 |
| o-methyl styrene | 2.31 | 1.0–6.0 |
| tri methyl benzene | 1.76 | 1.0–4.0 |
| beta-methyl styrene | 1.92 | 1.0–4.0 |
| dicyclopentadiene/cymene | 0.29 | 0.1–0.8 |
| indane | 1.31 | 0.5–2.5 |
| indene | 9.87 | 5.0–20.0 |
| methyl indane | 0.94 | 0.5–2.0 |
| $C_4$ benzenes | 2.97 | 2.0–4.0 |
| dimethyl styrene | 2.81 | 2.0–4.0 |
| divinyl Benzene | 0.99 | 0.5–2.0 |
| $C_2$ styrenes | 4.71 | 3.5–5.5 |
| methyl indenes | 9.69 | 6.0–11.0 |
| naphthalene | 2.19 | 1.0–4.0 |
| other non-reactives | 6.08 | 1.0–10.0 |

More generally speaking the resins according to the invention can be prepared from vinyl aromatic streams comprising the following.

| Components | Typical Range | Table IA Typical HCD |
|---|---|---|
| styrene | 1–15 | 8 |
| alkyl derivatives of styrene | 15–40 | 25 |
| indene | 5–20 | 10 |
| alkyl derivatives of indene | 3–15 | 10 |
| non-reactive components | 15–76 | 47 |

Such streams can be derived from the steam-cracked petroleum distillates, or fractions thereof, having boiling points between 135° C. and 220° C. so long as they contain or are modified to contain sufficient vinyl aromatic contents. For example, an essentially pure styrene component can be added to commercially available petroleum distillate products that but for styrene otherwise fit this description. In this manner a vinyl aromatic stream comprised of 11.4 wt. % styrene, 31.6 wt. % alkyl derivatives of styrene, 17.1 wt. % indene, 5 wt. % alkyl derivatives of indene, and the remainder non-reactive components (34.9 wt. %) was confirmed to be a suitable invention resin feedstock.

Polymerization is generally accomplished in accordance with the teachings of U.S. Pat. No. 4,078,132. According to this teaching, branched chain reactive aliphatic olefins are introduced during polymerization as chain transfer agents to achieve both lowered softening point and narrowed MWD. Though this document addresses preparation of substantially non-aromatic unsaturated thermoplastic resins, the teaching therein is applicable to feed streams comprising HCD, or feed streams comprising vinyl aromatic monomer(s), to yield a highly aromatic precursor resin, which when hydrogenated can yield the aromatic tackifier resin of the invention. The feed streams should contain at least 40% by weight of total polymerizable monomers of vinyl aromatic monomers, preferably at least 50% by weight.

The polymerization process of U.S. Pat. No. 4,078,132 is particularly suitable when practiced at polymerization temperatures of between −20° and 100° C., preferably between 30° and 80° C. in the presence of a Friedel-Crafts catalyst, such as AlCl$_3$, and in the presence of the branched chain reactive olefin chain transfer agent, preferably isoamylenes or dimate. Though most of the branched chain reactive olefin compounds of this prior art document will be effective if used in proper amounts, the isoamylenes are more reactive and can be used advantageously in lesser amounts. The isoamylenes typically comprise isomers, for example, as shown in Table IB. These reactive chain transfer agents are preferably used in lesser amount than generally taught in this document, typically only 10–20, preferably 10–15 wt. % based upon total weight of this HCD or vinyl aromatic feedstream in order to control softening point and MWD. The process conditions of U.S. Pat. No. 4,514,554 also include description of polymerization of petroleum fraction feedstocks including isoamylenes. Both references are incorporated by reference for purposes of U.S. patent practice.

Hydrogenation can be generally accomplished in accordance with the teachings of U.S. Pat. No. 4,629,766, which is also incorporated by reference for purposes of U.S. patent practice. But other conventional means may alternatively be used. Typically temperatures of 200° to 300° C. are used, pressures of 10 to 300 kg/cm$^2$, and hydrogenating or hydrotreating catalysts such as Group VIII metals nickel, palladium, cobalt, ruthenium, platinum and rhodium, Group VI metals such as tungsten, chromium and molybdenum, and Group VII metals such as manganese and copper are used. These metals may be used singularly or in combination of two or more metals, in the metallic form, or in an activated form and may be used directly or on a solid support such as alumina or silica-alumina. A preferred catalyst is one comprising sulfided nickel-tungsten on a gamma-alumina support having a fresh catalyst surface area ranging from 120–300 m$^2$/g and containing from 2–10% by weight nickel and from 10–25% by weight tungsten as described by U.S. Pat. No. 4,629,766. The hydrogenation is typically carried out with a hydrogen pressure of 20–300 atmospheres, preferably 150–250 atmospheres. Additional description of hydrogenation of aromatic resins appears in U.S. Pat. No. 3,926,878 and WO-A-91/07472, designated for the U.S. among other countries, both of which are incorporated by reference for purposes of U.S. patent practice.

Hydrogenation is performed at temperatures, pressures and times, and with effective catalysts, so as to retain at least 75% aromaticity, preferably at least 80%, more preferably at least 85%, and most preferably at least 90%. Optimization of the hydrogenation process can be empirically accomplished given the teachings presented in this application.

The aromatic tackifier resins of the invention can be used with water based acrylics when prepared as resin emulsions in accordance with any known means, such as exemplified in U.S. Pat. No. 4,414,346, U.S. Pat. No. 4,486,563 and U.S. Pat. No. 4,487,873. Typically the aromatic tackifier resin is emulsified in water and added to the water-based acrylic polymer to make a pressure sensitive adhesive composition. Alternatively, the tackifier resin can be introduced into the acrylic polymerization mix for "internal tackification", for example, as described in U.S. Pat. No. 5,106,902, U.S. Pat. No. 5,013,784, U.S. Pat. No. 5,095,065 and U.S. Pat. No. 5,164,441. The disclosures of these patents are incorporated by reference for purposes of U.S. patent practice. The invention resins may also be added directly to solvent acrylics or hot melt mixed with thermoplastic acrylics by conventional means.

Typical compositions comprise from 50 to 95 parts by weight acrylic polymer and 5 to 50 parts aromatic tackifier resin, or preferably 10–30 wt. % tackifier resin based upon total of acrylic polymer and resin.

Conventional additive components are often also incorporated in acrylic polymer compositions and will also be suitable in accordance with this invention. Some examples are fillers such as clay, silica and calcium carbonate and plasticizers such as Paraplex® WP-1, a plasticizer from Rohm and Haas Co. For the water based systems, defoamers, surfactants and thickeners are commonly used to aid in mixing and coating processes, and biocides are often employed for preservative properties. See additional description in Gehman, D. R., "Acrylic Adhesives", *Handbook of Adhesives*, 3rd. Ed., pp. 437–450 (Van Nostrand Reinhold, 1990).

Although primarily addressed to adhesive compositions, it will be apparent that the excellent adhesive qualities, color, age and UV stability, and compatibility of the resins in acrylic polymers will also provide advantages when such compositions are used as sealants, another area of significant use for acrylic polymers. Additionally, the resin of the invention being high in aromatic content and low in color will be particularly suitable for use with ethylene-vinyl ester copolymers in hot-melt adhesive compositions, for example as described in U.S. Pat. No. 3,926,878, and with styrene block polymers, for example as described in WO-A-91 07472. Both references are incorporated by reference for purposes of U.S. patent practice.

The following examples are presented to illustrate the foregoing discussion. All parts, proportions and percentages are by weight unless otherwise indicated. Although the examples may be directed to certain embodiments of the present invention, they are not to be viewed as limiting the invention in any specific respect.

EXAMPLE 1

The aromatic resins of this example were polymerized by a continuous, stirred reactor process using aluminum chloride as the catalyst in a nitrogen atmosphere at about 10 psig (0.7 kg/cm$^2$). The aluminum chloride catalyst was added either directly to the reactor in powdered form or in an anhydrous paste form. This was formed by mixing the catalyst with a hydrogenated liquid resin at a weight ratio of 0.6:1. The relative proportions of catalyst and feedstreams are shown in Table II. These were individually pumped into the continuous stirred tank reactor over a period of 6 hours. Water was used as the co-catalyst and was present in the feedstreams at a level of 50–100 ppm. Thereafter, 200 grams of a 1:3 solution of isopropanol and water were added to the final 1200 g. reaction mixture to quench the catalyst. The polymerizate was water washed 2 to 3 additional times with the aqueous phase being separated after each wash.

The resin recovery step was carried out by heating to 250° C., with a nitrogen sparge to remove raffinate followed by steam stripping to produce the precursor resin.

In this example, an isoamylene stream was used as chain transfer agent, except for Comparative Example D of Table II. The composition of the isoamylene stream for this example and other chain transfer streams are given below in Table IB.

TABLE IB

TYPICAL CHAIN TRANSFER AGENTS

| Component (Wt %) | Dimate | Amylenes | Isoamylenes |
|---|---|---|---|
| 1-pentene | 0.01 | 20.5 | — |
| 2-methyl-1-butene | 0.03 | 30.3 | 6.55 |
| isoprene | — | 0.77 | — |
| trans-2-pentene | 0.03 | 17.1 | — |
| cis-2-pentene | 0.01 | 8.45 | — |
| 2-methyl-2-butene | 0.13 | 5.36 | 93.3 |
| trans-1,3-pentadiene | 0.02 | — | — |
| cis-1,3-pentadiene | 0.01 | — | — |
| cyclopentene | 0.02 | — | — |
| 4-methyl-1-pentene | 0.64 | — | 0.04 |
| 2,3-dimethyl-1-butene | 1.48 | — | — |
| trans-4-methyl-2-pentene | 13.4 | — | — |
| 2-methyl-1-pentene | 4.10 | — | — |
| 1-hexene | 0.26 | — | — |
| trans-3-hexene | 4.02 | — | — |
| cis & trans-2-hexene and cis-3-hexene | 10.2 | — | — |
| 2-methyl-2-pentene | 31.3 | — | — |
| 2,3-dimethyl-2-butene | 2.96 | — | — |
| cis-2-hexene | 4.27 | — | — |
| benzene | 0.04 | — | — |
| dicyclopentadiene | — | 0.59 | — |

The following Table II gives the reaction conditions and properties of the precursor resins polymerized by the process described above.

TABLE II

| Resin Example | A | B | C | D | E |
|---|---|---|---|---|---|
| Feed Composition, wt. % | | | | | |
| Chain Transfer Agent | 14[1] | 10[1] | 10[1] | 0 | 25[2] |
| Heartcut Distillate[3] | 86 | 90 | 90 | 100 | 75 |
| Polymerization | | | | | |
| $AlCl_3$ Catalyst, wt. % | 0.6 | 0.6 | 0.6 | 0.6 | 0.6 |
| Reactor Temperature, °C. | 40 | 40 | 40 | 40 | 40 |
| Reactor Pressure, psig ($kg/cm^2$) | 10 (0.7) | 10 (0.7) | 10 (0.7) | 10 (0.7) | 10 (0.7) |
| Resin Properties | | | | | |
| Softening Point, °C. | 92 | 95 | 98 | 112 | 88 |
| $^1$H-NMR, % aromatic protons | 27 | nm | 29 | 30 | 26 |
| Gardner Color | nm | nm | nm | 10 | nm |
| GPC Molecular Weight | | | | | |
| $M_w$ | 450 | 570 | 525 | 860 | 600 |
| $M_n$ | 280 | 290 | 310 | 440 | 330 |
| $M_w/M_n$ | 1.6 | 1.8 | 1.7 | 2.0 | 1.8 |
| $M_z$ | 760 | 1010 | 965 | 1700 | 1430 | notes: 1) Isoamylene; 2) Dimate; 3) HCD is that of Typical Content in Table IA; 4) "nm" is not measured The aromatic resins A–E were each blended with 60 wt % of an aliphatic solvent (Varsol®, Exxon Chemical Co., USA) and then hydrogenated in accordance with the examples and teachings of U.S. Pat. No. 4,629,766, at a hydrogen pressure of 3800 psig (267 $kg/cm^2$) for 1.5 hours residence time with an exotherm maximum temperature of 240° C. over the preferred sulfided nickel-tungsten catalyst described above. This resin was then recovered by heating to 250° C. with a nitrogen sparge and stream stripping to produce the finished resin.

The thus hydrogenated resins A–E exhibited the characteristics in Table III. Aged Gardner Color, was as measured after 5 hrs. at a temperature of 175° C.

TABHLE III

| Resin Example | A | B | C | D | E |
|---|---|---|---|---|---|
| Softening Point, °C. | 92 | 95 | 98 | 119 | 87 |
| 1H-NMR, % aromatic protons | 24 | 29 | 27 | 29 | 21 |
| Retained Aromaticity % | 89 | | 93 | 97 | 81 |
| Saybolt color | 29 | 27 | 28 | 20 | 24 |
| Aged Gardner Color | nm | 4.0 | 4.7 | 17 | nm |
| GPC Molecular Weight | | | | | |
| $M_w$ | 445 | 520 | 540 | 860 | 530 |
| $M_n$ | 300 | 300 | 330 | 440 | 330 |
| $M_w/M_n$ | 1.5 | 1.7 | 1.6 | 2.0 | 1.6 |
| $M_z$ | 700 | 920 | 916 | 1700 | 970 |

EXAMPLE 2

This example illustrates the enhancements available from use of a resin in accordance with the invention when compared against a hydrogenated rosin ester (Foral® 85 emulsion, Hercules, Inc., U.S.A.) commercially used to tackily acrylic adhesive polymers, particularly the more polar acrylic polymers such as those based on butyl acrylate. This invention resin prepared as in Example 1, after hydrogenation exhibited 25% aromatic protons, an $M_z$ of 940, MWD of 1.7, and a ring and ball softening point (according to ASTM E-28) of 96° C. The invention resin also exhibited a color of 14 Saybolt. This resin was then emulsified in accordance with the teachings of U.S. Pat. No. 4,414,346, U.S. Pat. No. 4,486,563, and U.S. Pat. No. 4,487,873. In this case the resinplast used to facilitate emulsification was heptane.

Robond® PS-83D, Rhoplex® N-619 and Rhoplex® N-580 are water-based acrylic emulsions available from Rohm & Haas Co. Ucar® 174 is a water-based acrylic emulsion from Union Carbide. These commercial acrylic emulsions are believed to be based on butyl acrylate. Table IV illustrates PSA performance using standard test methods. Each adhesive composition was blended in aqueous form in parts by weight (solids or dry basis) and coated onto mylar film to 1.25 mils dry-film thickness. The coated films were dried for 2 min. at 100° C. The films were then covered with release paper and allowed to set overnight at room temperature and 50% humidity.

Both the hydrogenated rosin ester and the invention resin show good compatibility with these acrylic polymers as evidenced by the existence of excellent film clarity. Both resins enhance adhesive aggressiveness and specific adhesion as would be expected of a properly selected resin composition. However, the invention resin results in much less adhesive softening/loss in shear strength ("hold to stainless steel"/creep under load) than the rosin ester. This is a significant drawback associated with rosin esters. The invention resin also shows enhanced wetting/adhesion to kraft paper (corrugated board) as demonstrated by fiber tear values. Finally, these attributes are combined with the invention resin's superior initial color (water white versus 3 Gardner for the rosin ester) and color, age and UV stability. Color and stability now more closely match the inherent qualities of acrylic polymers.

TABLE IV

| Formulations: | 1 | 2 | 3 | 4 | 5 | 6 | 7 | 8 | 9 | 10 | 11 | 12 |
|---|---|---|---|---|---|---|---|---|---|---|---|---|
| Robond PS-83D | 100 | | | | 75 | | | | 75 | | | |
| Rhoplex N-619 | | 100 | | | | 75 | | | | 75 | | |
| Rhoplex N-580 | | | 100 | | | | 75 | | | | 75 | |
| Ucar 174 | | | | 100 | | | | 75 | | | | 75 |
| Invention Resin | | | | | 25 | 25 | 25 | 25 | | | | |
| Foral 85 | | | | | | | | | 25 | 25 | 25 | 25 |
| PSA Performance (1) | | | | | | | | | | | | |
| Loop Tack to SS, ppi | 1.6 | 3.6 | 1.2 | 3.1 | 3.0 | 3.1 | 2.1 | 3.5 | 2.6 | 4.0 | 1.7 | 4.0 |
| (g/cm) | (282) | (635) | (212) | (547) | (530) | (547) | (371) | (618) | (459) | (706) | (300) | (706) |
| Loop Tack to Kraft Paper, ppi | 1.9 | 2.6 | 1.4 | 2.2 | 1.8 | 1.5 | 1.8 | 1.8 | 2.0 | 2.3 | 1.5 | 2.0 |
| (g/cm) | (335) | (459) | (247) | (388) | (318) | (265) | (318) | (318) | (353) | (406) | (265) | (353) |
| % Fiber Tear (visual) | 2 | 18 | 0 | 1 | 67 | 100 | 25 | 67 | 0 | 17 | 5 | 0 |
| 180° Peel Strength to SS, ppi | 2.2 | 3.3 | 1.5 | 3.5 | 3.1 | 4.1 | 2.5 | 3.8 | 3.4 | 6.0 | 2.3 | 4.6 |
| (g/cm) | (388) | (582) | (265) | (618) | (547) | (724) | (441) | (671) | (600) | (1059) | (406) | (812) |
| 180° Peel Strength to PE, ppi | 0.5 | 1.3 | 0.3 | 0.9 | 1.3 | 0.6 | 1.1 | 1.7 | 1.6 | 2.3 | 1.2 | 2.0 |
| (g/cm) | (88) | (229) | (53) | (158) | (229) | (106) | (194) | (300) | (282) | (406) | (212) | (353) |
| 178° Hold to SS, hrs (0.5" × 0.5" × 500 g) | 11.3 | 5.8 | 1.8 | 4.6 | 5.8 | 9.3 | 11.7 | 4.3 | 2.8 | 3.2 | 13.0 | 2.8 |
| Film Clarity (visual) | clear | clear | clear | clear | clear | clear | ctear | clear | clear | clear | clear | clear |

(1) Test methods: loop tack - one inch wide adhesive strip contacted 3–4" along its length to stainless steel panel and then immediately debonded at a 2 inches/min jaw separation speed; peel strength - PSTC 1; hold to stainless steel (SS) - PSTC 7.

EXAMPLE 3

The performance characteristics of a hydrogenated resin in accordance with the invention were also compared against commercially available resins sold as high aromaticity hydrogenated resins. This invention resin exhibited 24% aromatic protons, an $M_z$ of 1050, MWD of 1.6, and a ring and ball softening point (according to ASTM E-28) of 95° C. The invention resin also exhibited a color of 26 Saybolt.

Arkon® M-90 and Arkon® P-90 (Arakawa Chemical, Japan) are 90° C. softening point resins indicated by their manufacturer to be aromatic resins hydrogenated to different degrees. Likewise, Arkon® M-100 and Arkon® P-100 are 100° C. softening point, aromatic resins with differing degrees of hydrogenation. Analysis by $^1$H-NMR shows that the invention resin possesses considerably more aromaticity than the Arkon M series at 7.3% and the Arkon P series at 1.2% aromatic protons. This differentiation yielded much superior performance as an acrylic polymer tackifier.

In order to compare resins at equal softening point the Arkon® M-90 and M100 were blended 50/50 to achieve a 95° C. softening point. In the same manner Arkon® P-90 and Arkon® P-100 were also blended. These blended compositions were emulsified in the manner described earlier. Adhesive performance comparison with the invention resin is shown in Table V. Adhesive film preparation and test methods are the same as in Example 2. The invention resin clearly exhibits better tack and adhesion than the commercial hydrogenated aromatic resins (these resins actually reduce the properties of the adhesive base polymers). The invention resin also produces films with greater clarity.

TABLE V

| Formulations: | 1 | 2 | 3 | 4 | 5 | 6 | 7 | 8 | 9 | 10 | 11 | 12 |
|---|---|---|---|---|---|---|---|---|---|---|---|---|
| Invention Resin | 25 | 25 | 25 | 25 | | | | | | | | |
| Arkon M-90/100 | | | | | 25 | 25 | 25 | 25 | | | | |
| Akron P-90/100 | | | | | | | | | 25 | 25 | 25 | 25 |
| Robond PS-83D | 75 | | | | 75 | | | | 75 | | | |
| Rhoplex N-619 | | 75 | | | | 75 | | | | 75 | | |
| Rhoplex N-580 | | | 75 | | | | 75 | | | | 75 | |
| Ucar 174 | | | | 75 | | | | 75 | | | | 75 |
| PSA Performance (1) | | | | | | | | | | | | |
| Loop Tack to Kraft Paper, ppi | 1.5 | 1.4 | 1.6 | 1.6 | 0.2 | 0.5 | 0.2 | 1.1 | 0.1 | 0 | 0 | 0.9 |
| (g/cm) | (265) | (247) | (282) | (282) | (35) | (88) | (35) | (194) | (18) | (0) | (0) | (158) |
| % Fiber Tear (visual) | 40 | 100 | 50 | 90 | 0 | 0 | 0 | 5 | 0 | 0 | 0 | 0 |
| 180° Peel Strength to SS, ppi | 2.3 | 3.4 | 2.6 | 3.4 | 1.0 | 1.3 | 0.7 | 1.2 | 0.8 | 0.6 | 0.5 | 1.1 |
| (g/cm) | (406) | (600) | (459) | (600) | (177) | (229) | (124) | (212) | (141) | (106) | (88) | (194) |
| 180° Peel Strength to PE, ppi | 1.1 | 0.8 | 1.0 | 1.5 | 0.6 | 0.3 | 0.4 | 0.7 | 0.3 | 0.2 | 0.2 | 0.4 |
| (g/cm) | (194) | (141) | (177) | (265) | (106) | (53) | (71) | (124) | (53) | (35) | (35) | (71) |

(1) Test methods: loop tack - one inch wide adhesive strip contacted 3–4" along its length to stainless steel panel and then immediately debonded at a 2 inches/min jaw separation speed; peel strength - PSTC 1; hold to stainless steel (SS) - PSTC 7.

We claim:

1. A method for preparing a hydrogenated aromatic tackifier resin suitable as a tackifier for acrylic adhesive polymers comprising the steps of:
   a) polymerizing under Friedel-Crafts polymerization conditions steam-cracked petroleum distillates, or fractions thereof, having boiling points between about 135° C. and 220° C. and containing at least 40% by weight vinyl aromatic monomer contents, in the presence of 0–40% by weight of polymerization mixture of a chain transfer agent; and
   b) catalytically hydrogenating the results of the results of a) such that at least 75% of the aromaticity is retained.

2. The method according to claim 1 wherein an isoamylene chain transfer agent is used in an amount of 10–20% by weight of polymerization mixture.

3. The method according to claim 1 wherein step b) is done using a sulfided nickel-tungsten on a gamma-alumina support.

* * * * *